United States Patent
Alapati et al.

(10) Patent No.: US 11,258,757 B2
(45) Date of Patent: Feb. 22, 2022

(54) MANAGEMENT OF BLACKLISTS AND DUPLICATE ADDRESSES IN SOFTWARE DEFINED NETWORKS

(71) Applicant: VMware, Inc., Palo Alto, CA (US)

(72) Inventors: Rishi Kanth Alapati, Dublin, CA (US); Parasuramji Rajendran, San Jose, CA (US); Weiming Xu, Palo Alto, CA (US); Shireesh Kumar Singh, Sunnyvale, CA (US); Aditi Vutukuri, Milpitas, CA (US); Anuprem Chalvadi, Milpitas, CA (US); Chidambareswaran Raman, Sunnyvale, CA (US); Margaret Angeline Petrus, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 13 days.

(21) Appl. No.: 16/746,075

(22) Filed: Jan. 17, 2020

(65) Prior Publication Data
US 2020/0280537 A1  Sep. 3, 2020

Related U.S. Application Data

(60) Provisional application No. 62/812,135, filed on Feb. 28, 2019.

(51) Int. Cl.
| | | |
|---|---|---|
| *H04L 29/06* | (2006.01) | |
| *H04L 12/24* | (2006.01) | |
| *H04L 29/12* | (2006.01) | |
| *H04L 41/0806* | (2022.01) | |
| *H04L 41/00* | (2022.01) | |
| *H04L 61/5007* | (2022.01) | |

(52) U.S. Cl.
CPC ...... *H04L 63/0236* (2013.01); *H04L 41/0806* (2013.01); *H04L 41/20* (2013.01); *H04L 61/2007* (2013.01)

(58) Field of Classification Search
CPC . H04L 63/0236; H04L 41/0806; H04L 41/20; H04L 61/2007
See application file for complete search history.

(56) References Cited

U.S. PATENT DOCUMENTS

2013/0097329 A1* 4/2013 Alex ................ H04L 61/1511
709/228
2018/0295036 A1* 10/2018 Krishnamurthy ... G06F 11/3006

FOREIGN PATENT DOCUMENTS

| CN | 101599889 A | * 12/2009 | |
|---|---|---|---|
| WO | WO-2008141584 A1 | * 11/2008 | ......... H04L 61/2015 |
| WO | WO-2011047571 A | * 4/2011 | ............. H04L 51/12 |

* cited by examiner

*Primary Examiner* — Christopher B Robinson

(57) ABSTRACT

Described herein are systems and methods to manage blacklists and duplicate addresses in software defined networks (SDNs). In one implementation, a method includes, in a control plane and data plane of an SDN environment, obtaining a blacklist for a logical port in the SDN environment. The method further includes deleting realized address bindings in a realized address list for the logical port that match the one or more address bindings in the blacklist and preventing subsequent address bindings that match the one or more address bindings in the blacklist from being added to the realized address list.

17 Claims, 7 Drawing Sheets

MANAGEMENT OF BLACKLISTS AND DUPLICATE ADDRESSES IN SOFTWARE DEFINED NETWORKS

RELATED APPLICATIONS

This application hereby claims the benefit of and priority to U.S. Provisional Patent Application No. 62/812,135, titled "METHOD TO DETECT DUPLICATE NETWORK ADDRESSES AND BLACKLIST CERTAIN ADDRESSES IN SDN ENVIRONMENT," filed Feb. 28, 2019, and which is hereby incorporated by reference in its entirety.

BACKGROUND

Software defined networks include logical entities that provide various networking operations for computing elements, such as virtual machines and containers. The networking operations may include routing operations, switching operations, firewall operations, or some other networking operations. To implement the networking operations, a networking controller may be required to distribute software defined networking configuration data to various computing elements that host the logical entities of the software defined networks. These computing elements may comprise host computing systems for virtual nodes, such as containers or virtual machines, may comprise routing or switching elements, or may comprise some other computing element.

In some implementations, as the number of logical devices and logical ports are increased, it can become difficult and cumbersome to manage address bindings for the various logical elements. In particular, administrators may encounter obstacles in efficiently and effectively managing blacklists and addressing duplication across the software defined networking environment.

OVERVIEW

The technology disclosed herein manages blacklists and duplicate addresses in software defined networks. In one implementation, a method of blacklisting addresses in a Software Defined Networking (SDN) environment includes, in a management plane of the SDN environment, configuring one or more address bindings in a blacklist for a logical port in the SDN environment. The method further includes passing the blacklist from the management plane to a data plane and a control plane for the logical port. The method further provides, in the data plane and the control plane, deleting realized address bindings in a realized address list for the logical port that match the one or more address bindings in the blacklist and preventing subsequent address bindings that match the one or more address bindings in the blacklist from being added to the realized address list.

DETAILED DESCRIPTION

Figure 1:
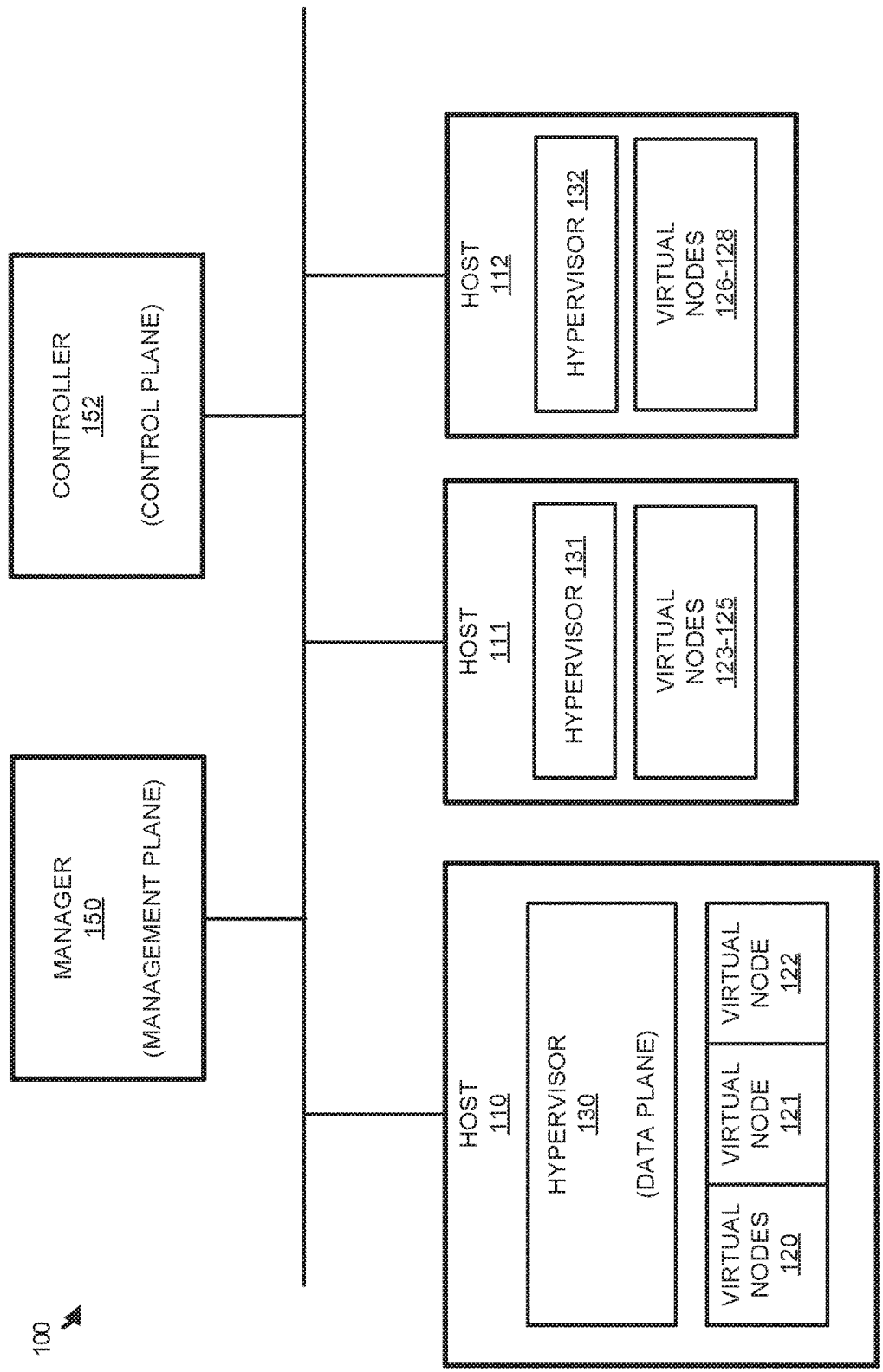
FIG. 1 illustrates a computing network to manage blacklists and duplicate addresses for a Software Defined Networking (SDN) environment according to an implementation.

FIG. 1 illustrates a computing network 100 to manage blacklists and duplicate addresses for a Software Defined Networking (SDN) environment according to an implementation. Computing network 100 includes manager 150, controller 152, and hosts 110-112. Hosts 110-112 further include hypervisors 130-132 and virtual nodes 120-128. Although demonstrated as a single element, it should be understood that controller 152 may operate as a distributed or clustered service in some examples. In one embodiment, controller 152 includes a local control plane that may execute at least partially on each of the hosts and may provide operations as part of hypervisors 130-132.

In operation, hypervisors 130-132 execute on hosts 110-112 to provide a platform for virtual nodes 120-128, wherein virtual nodes 120-128 may comprise virtual machines, containers, or some other virtualized endpoint. In at least one example, hypervisors 130-132 may be used to abstract the physical components of the corresponding hosts and provide virtualized components to the virtual nodes. The virtualized components may comprise processing resources, storage resources, memory resources, network resources, and the like. Here, in addition to providing a platform for the execution of virtual nodes, hypervisors 130-132 may further be used to provide software defined networking (SDN) operations for communications required by the virtual nodes. These SDN operations may include switching operations, firewall operations, routing operations, blacklisting operations, or some other operations.

To configure the software defined networks in computing network 100, manager 150 and controller 152 are provided. Manager 150 may be used to provide a single point of configuration using one or more application programming interfaces (API). For example, an administrator associated with computing network 100 may generate a blacklist (using an API, web, or other interface) that can prevent the use of internet protocol (IP) addresses with one or more logical ports in computing network 100. Controller 152 is representative of a state management system that provides control plane functionality for routing and switching functions. Controller 152 may be used to obtain a configuration request from manager 150 and distribute information about the configuration to required hosts and hypervisors within computing network 100. Consequently, when an administrator generates a blacklist using manager 150, controller 152 may identify the request for the blacklist, identify hosts that are associated with the request, and forward a configuration update to the corresponding host or hosts. In forwarding and implementing the configuration, controller 152 may operate in the control plane that is used to determine what communication paths should be used for a packet when it is identified in a software defined network, whereas the data plane, implemented by hypervisors 130-132, forwards traffic based on the control plane logic.

Figure 2:
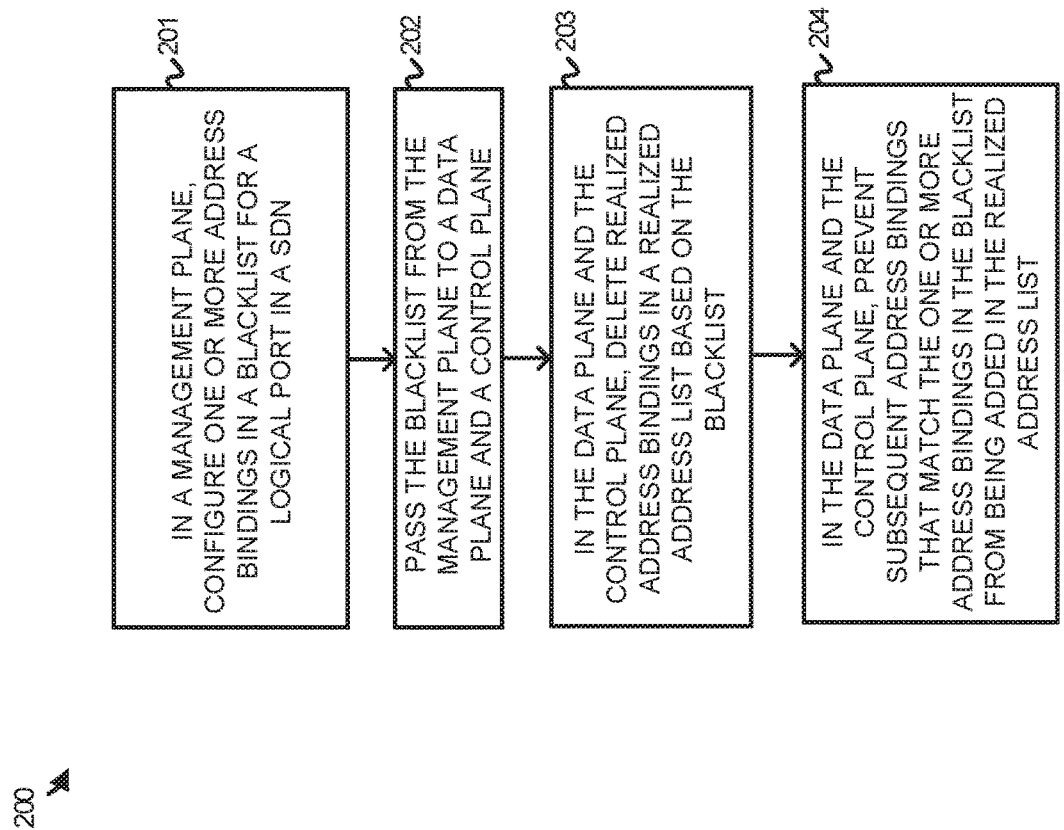
FIG. 2 illustrates a method of managing blacklists in an SDN environment according to an implementation.

FIG. 2 illustrates a method 200 of managing blacklists in an SDN environment according to an implementation. The steps in method 200 are referenced parenthetically in the paragraphs that follow with reference to systems and elements of computing network 100 of FIG. 1.

As depicted, method 200 includes, in a management plane, configuring (201) one or more address bindings in a blacklist for a logical port in an SDN environment. An address binding in the blacklist may indicate a virtual local area network (VLAN), a media access control (MAC) address, an IP address, or some other addressing information that should be blacklisted for the logical port, including combinations thereof. In a software defined network (SDN) each virtual node 120-128 may be associated with a logical switch (also referred to as a datapath set) that is decoupled from the underlying physical network. Each logical switch has a set of logical ports that are each connected with a logical interface (e.g., a virtual network interface ("VNIC") of the virtual node. Each logical port is mapped to a virtual port of a virtual switch provided by the hypervisor. The virtual switch operates as a physical Layer 2 switch within each of hypervisors 130-132. In addition to virtual switches (not shown) hypervisors 130-132 may include distributed logical routers, distributed firewall components, virtual tunnel endpoints, etc. for implementing and managing the software defined networks. The virtual switches each have forwarding tables populated with forwarding table entries that collectively implement the logical switches. Bindings may therefore reside at the control plane, including the local control plane at each host, as well as forwarding tables associated with virtual switches, logical routers, tunnel endpoints, firewalls, etc. When a MAC address, IP address, or VLAN identifier is bound to a particular logical port, it is also bound to the corresponding virtual port. Traffic addressed to a particular destination MAC, IP, and VLAN address tuple is directed by the virtual switch according to the forwarding table entries of the virtual switch and forwarding elements to the corresponding virtual port associated with the destination logical interface.

Once the blacklist is configured, the management plane may pass (202) the blacklist to a data plane and a control plane. For example, an administrator of computing network 100 may generate a blacklist for a logical port in the SDN environment, wherein the blacklist may indicate IP addresses, MAC addresses, and/or VLANs to be blacklisted for the logical ports. Once generated using manager 150, the blacklist may be provided to controller 152, which in turn could distribute the blacklist information to the corresponding host or hosts 110-112 associated with the logical port.

After the blacklist is received by the control plane and the data plane, the control plane and data plane may delete (203) realized address bindings in a realized address list for a logical port based on the blacklist. For example, a binding in the blacklist may comprise an IP address, a MAC address, and a VLAN that is not permitted to be bound to a logical port in the SDN environment. When the binding is received by controller 152, controller 152 may identify any bindings in the realized address list that match the received blacklist binding, wherein the realized address list stores active and approved bindings for the SDN environment. If a match is identified that includes the attributes of the blacklist binding, controller 152 may remove the matched address from the realized address list. Additionally, controller 152 may forward the blacklist to the data plane provided by the associated hypervisor, permitting the data plane to cache the blacklist and remove any binding entries in a discovered list that match a binding in the blacklist. Thus, if a blacklist applied to a logical port provided by hypervisor 130, controller 152 may forward the blacklist to hypervisor 130, permitting the hypervisor to remove any bindings in a discovered list for the port, wherein the discovered list may include addresses information about any address discovered in association with the port (permitted and unpermitted). In removing the addresses from the realized list in the control plane, any corresponding bindings present in forwarding tables associated with virtual switches, logical routers, firewall tables, tunnel endpoints, etc., would also be removed.

Once the control plane and the data plane delete any bindings associated with the blacklist, the control plane and data plane may prevent (204) subsequent address bindings that match the one or more address bindings in the blacklist from being added to the realized address list. In at least one implementation, hypervisor 130 may monitor for new discovered bindings, wherein the new bindings may be discovered using Address Resolution Protocol (ARP), Dynamic Host Configuration Protocol (DHCP), Neighbor Discovery Protocol, or some other protocol. For example, hypervisor 130 may monitor traffic associated with the various ports for virtual nodes 120-122 and identify addressing attributes from packets transmitted by virtual nodes 120-122. If the addressing information in a packet matches a binding in the blacklist, then the hypervisor will not add the new binding to a discovered list. However, if addressing information in a newly discovered binding does not match a binding in the blacklist, then the hypervisor may add the binding to a discovered list and forward the binding to controller 152. Controller 152 may determine that the binding does not correspond to a binding in the blacklist and may add the new binding to a realized address list (and in some examples a discovered list maintained by controller 152). Controller 152 may then distribute the realized address list information to network services that can provide firewalls, spoof management, ARP suppression, or some other network service.

Figure 3:
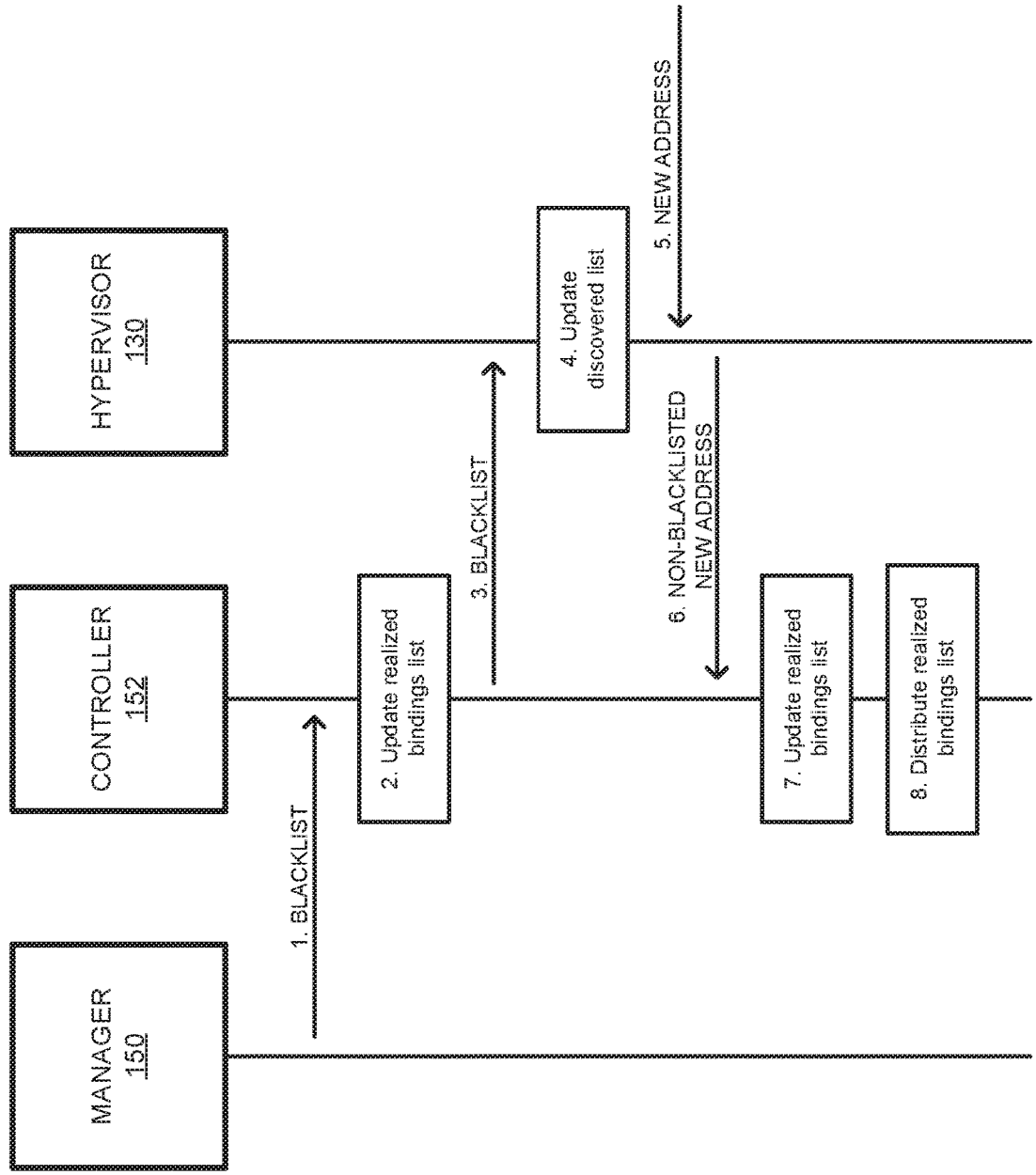
FIG. 3 illustrates a timing diagram to demonstrate blacklist management in an SDN environment according to an implementation.

FIG. 3 illustrates a timing diagram 300 to demonstrate blacklist management in an SDN environment according to an implementation. Timing diagram 300 includes manager 150, controller 152, and hypervisor 130 from computing network 100 of FIG. 1. Other elements of computing network 100 have been omitted for the sake of clarity.

As depicted, manager 150 may generate and provide, at step 1, a blacklist to controller 152, wherein the blacklist may include one or more address bindings to be blocked as part of an SDN configuration. In response to obtaining the blacklist from manager 150, controller 152 may update a realized bindings list at step 2, which represents active and permitted address bindings to a logical port in the SDN environment. In particular, controller 152 may determine whether a binding in the realized bindings list matches a binding in the provided blacklist. Once a match is identified, controller 152 may remove or delete the binding from the realized bindings list.

In addition to updating the realized bindings list, controller 152 may provide, at step 3, the blacklist to a hypervisor associated with the blacklist, which is represented in this example as hypervisor 130. In some implementations, controller 152 may determine the relevant host or hosts in the computing network for the blacklist and forward the blacklist to the corresponding host or hosts. Once received, the hypervisor may cache the blacklist and update a discovered list that corresponds to any matched bindings identified by the hypervisor at step 4. Once updated, the hypervisor may also provide an updated discovered list to controller 152 indicating any changes to the discovered list based on the provided blacklist and permitting the controller to update a local discovered list. Information about the discovered list may also be provided to manager 150 indicating any changes to the discovered list identified by hypervisor 130.

After updating controller 152 and hypervisor 130, hypervisor 130 may monitor for any newly discovered bindings, wherein the bindings may be identified using ARP, DHCP, Neighbor Discovery Protocol, or some other protocol. When a new address binding is identified at step 5, hypervisor 130 may determine whether the address binding corresponds to a binding entry in the cached blacklist. If the new address binding does correspond to an entry in the blacklist, then the new address binding may be blocked and prevented from being added to the discovered list. In contrast, if the new address binding does not correspond to an entry in the blacklist, then the new address binding may be added to the discovered list and an update for the discovered list may be provided to controller 152 at step 6. In response to receiving the updated discovered list with the non-blacklisted address, controller 152 may update, at step 7, the realized bindings list and distribute, at step 8, the realized bindings list to one or more services in the SDN environment.

Figure 4:
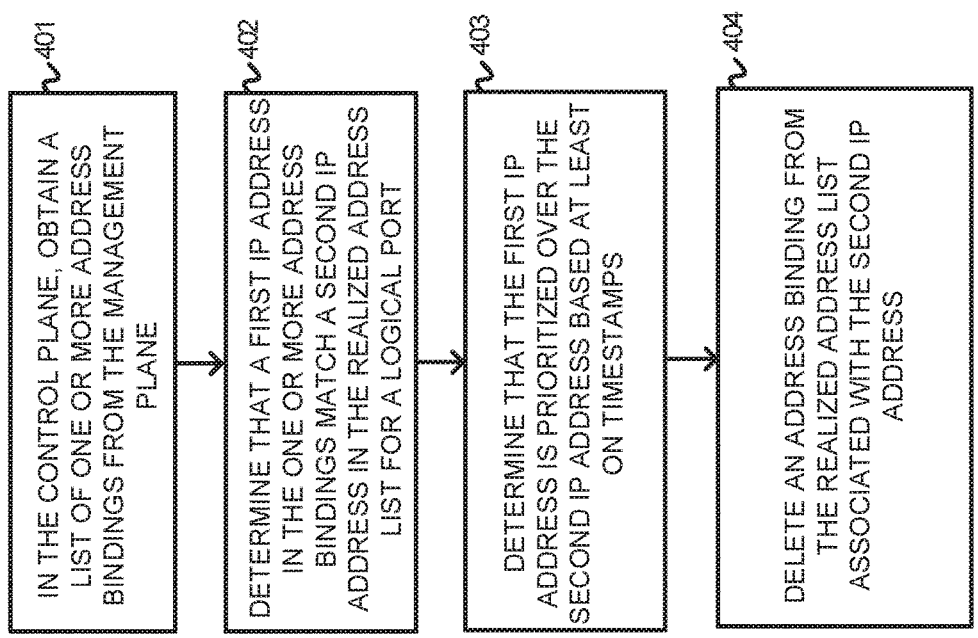
FIG. 4 illustrates a method of managing duplicate addresses in an SDN environment according to an implementation.

FIG. 4 illustrates a method 400 of managing duplicate addresses in an SDN environment according to an implementation. The steps of method 400 are referenced parenthetically in the paragraphs that follow with references to systems and element of computing network 100. The operations will be described with respect to hypervisor 130, but it should be understood that hypervisors 111-112 may provide similar operations.

As depicted method 400 includes, in the control plane, obtaining (401) a list of one or more address bindings from the management plane. In response to obtaining the one or more address bindings, the control plane determines (402) that a first IP address in the one or more address bindings match a second IP address in the realized address list for a logical port. Once identified, the control plane may determine (403) that the first IP address is prioritized over the second IP address based on timestamps associated with the first IP address and the second IP address and delete (404) an address binding from the realized address list associated with the second IP address.

In some implementations, the control plane may, when a duplicate IP address is identified on two or more logical ports of a network, determine which of the IP addresses is associated with an earlier timestamp. Once the IP address with the earliest timestamp is identified, the realized address list for the logical port associated with the IP address may be updated to include the address binding associated with the IP address. Additionally, any other realized address lists for other logical ports may be prevented from adding an address binding associated with the IP address to their corresponding realized address list.

In some examples, the control plane may also determine when a binding is removed from a realized address list associated with a logical port. This binding may be removed based on an update to a blacklist, based on a timeout associated with the binding, or based on some other event. When a binding is removed from the realized address list, the control plane may determine that the IP address for the binding can be assigned to another realized address list. In an implementation, if the IP address had been attempted to be registered on other logical ports, but were prevented from doing so based on timestamp priority, the control plane may identify timestamps associated with when the IP address was attempted to be realized on at least one other logical port, and select another logical port based on the timestamps. Thus, if an IP address were first placed in a realized address list for a logical port associated with virtual node 120 and, subsequently, a registration request were generated for the logical port associated with virtual node 122 to register the same binding, the control plane may prevent the registration of the binding. Instead, when the address binding is removed from the realized address list associated with virtual node 120, the control plane may identify the removal of the IP address, and permit the realized address list associated with virtual node 122 to register the binding for the IP address.

Although demonstrated in the previous example as updating a realized address list based on information from a management plane, it should be understood that similar operations may be employed by the control plane to update realized address lists associated with logical ports based on bindings that are identified in the data plane. These bindings may be identified using ARP, DHCP, Neighbor Discovery Protocol, or some other protocol or service. In at least one example, when a new a new address binding is identified in the data plane, the control plane may determine whether the IP address is duplicated in another realized address list. If duplicated, the control plane may implement the timestamp resolution processes described above with respect to method 400.

While demonstrated in the previous examples as resolving duplicate IP addressing conflicts based on the earlier timestamp, it should be understood that an SDN environment may resolve the conflicts using alternative operations. These alternatives may include updating the realized lists based on the newest timestamps, based on prioritizing bindings from the management plane over bindings from the data plane, or some other configuration. In some examples, the prioritization rules may be defined by an administrator of the SDN environment, wherein the administrator may define what bindings take precedence over other bindings when duplicate IP addresses are discovered.

Figure 5:
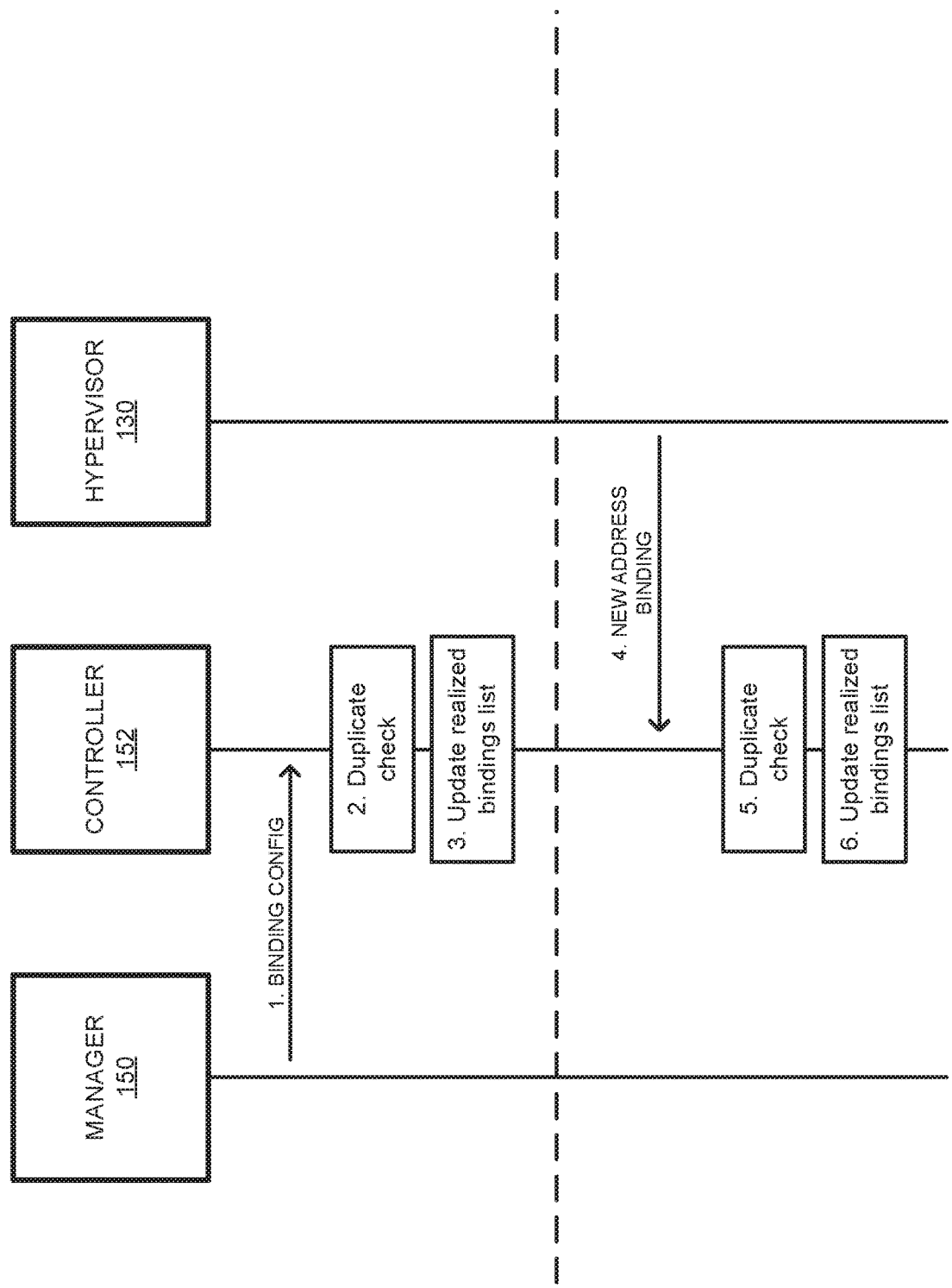
FIG. 5 illustrates a timing diagram to demonstrate duplicate addressing management in an SDN environment according to an implementation.

FIG. 5 illustrates a timing diagram 500 to demonstrate duplicate addressing management in an SDN environment according to an implementation. Timing diagram 500 includes manager 150, controller 152, and hypervisor 130 from computing network 100 of FIG. 1.

In operation, manager 150 may provide, at step 1, one or more address bindings to controller 152. Once received, controller 152 may update a realized bindings list for at least one logical port based on the received one or more address bindings. In some implementations, controller 152 may compare, at step 2, IP addresses in the one or more address bindings to IP addresses in a realized address list for a logical port and/or a list of duplicate addresses in the SDN environment. If a match exists, controller 152 may resolve the conflict, by determining which of the IP addresses is associated with an earlier timestamp. The IP address with the earlier timestamp may take precedence over the IP address with the later timestamp. Accordingly, if the IP address in the realized address list were associated with an earlier timestamp, the realized address list may remain unchanged. In contrast, if the IP address from manager 150 were associated with the earlier timestamp for another logical port, then an address binding in the realized address list associated with the IP address may be removed. Additionally, controller 152 may add, at step 3, the new address binding from the one or more address bindings to a realized address list associated with the other logical port.

In some implementations, in addition to or in place of managing duplicate bindings provided from manager 150, the data plane or hypervisor 130 may report, at step 4, information about a new address binding. In response to the report, controller 152 may determine, at step 5, whether an IP address in the new address binding corresponds to a duplicate IP address in a realized address list for a logical port and controller 152 may update, at step 6, the realized address list based on whether a match is found. For example, using ARP, DCHP, or some other service, hypervisor 130 may identify a new binding reported on a logical port in the SDN environment. Once obtained, the IP address associated with the binding may be compared with IP addresses in realized lists for the logical ports in the SDN. If the IP address is not identified as being duplicated, the address binding may be added to the realized list associated with the logical port on which the binding was identified.

However, if a matching IP address is identified in a realized list of another logical port, controller 152 may be required to determine which of the address bindings has priority. In some implementations, controller 152 may, during the duplicate check, identify which of the matching IP addresses is associated with an earlier timestamp and allocate priority to the IP address with the earlier timestamp. The realized address list corresponding to the earliest timestamp may then be permitted to include the address binding for the IP address, while any other realized list may not be permitted to include the corresponding address. Additionally, when an address binding is added or used to update a realized bindings list, a data structure may be updated to include the IP address. As a result, if the IP address is identified during a subsequent binding in association with another logical port, controller 152 may consult the data structure to identify the conflict.

In some implementations, when multiple logical ports attempt to register the same IP address, controller 152 may monitor for when a current address binding is removed from a realized bindings list. Once it is removed, controller 152 may identify one or more other logical ports that have attempted to register the same IP address and select a logical port from the one or more logical ports to have the IP address and corresponding address binding added to the realized list of the logical port. In some examples, the selection or prioritization of the logical port may be based on the timestamp of when the IP address was attempted to be registered, wherein the earliest timestamp for registration may be selected and the corresponding realized list updated with the address binding. In other examples, controller 152 may determine the prioritization for adding an address binding based on whether the binding was discovered from the management plane or the data plane, the newest timestamp, or some other method of prioritizing bindings to replace deleted bindings.

In some implementations, two ports may attempt to register the same IP address at the same timestamp. To resolve the conflict, controller 152 may assign the IP address to the port with the higher priority value, to the port with the lowest or highest identifier value, or in some other manner. Further, when IP address conflicts are identified for the realized list, controller 152 may provide a summary of the conflicts to manager 150, wherein manager 150 may provide a notification to an administrator associated with the SDN environment, indicating the conflicts.

In some examples, rather than resolving conflicts based on the earliest timestamp, controller 152 may resolve conflicts based on the IP address with the newest timestamp, based on discoveries from the manager 150 being prioritized over discoveries from the data plane, or based on any other preference. In at least one implementation, the preferences may be provided by an administrator associated with the SDN environment.

Figure 6:
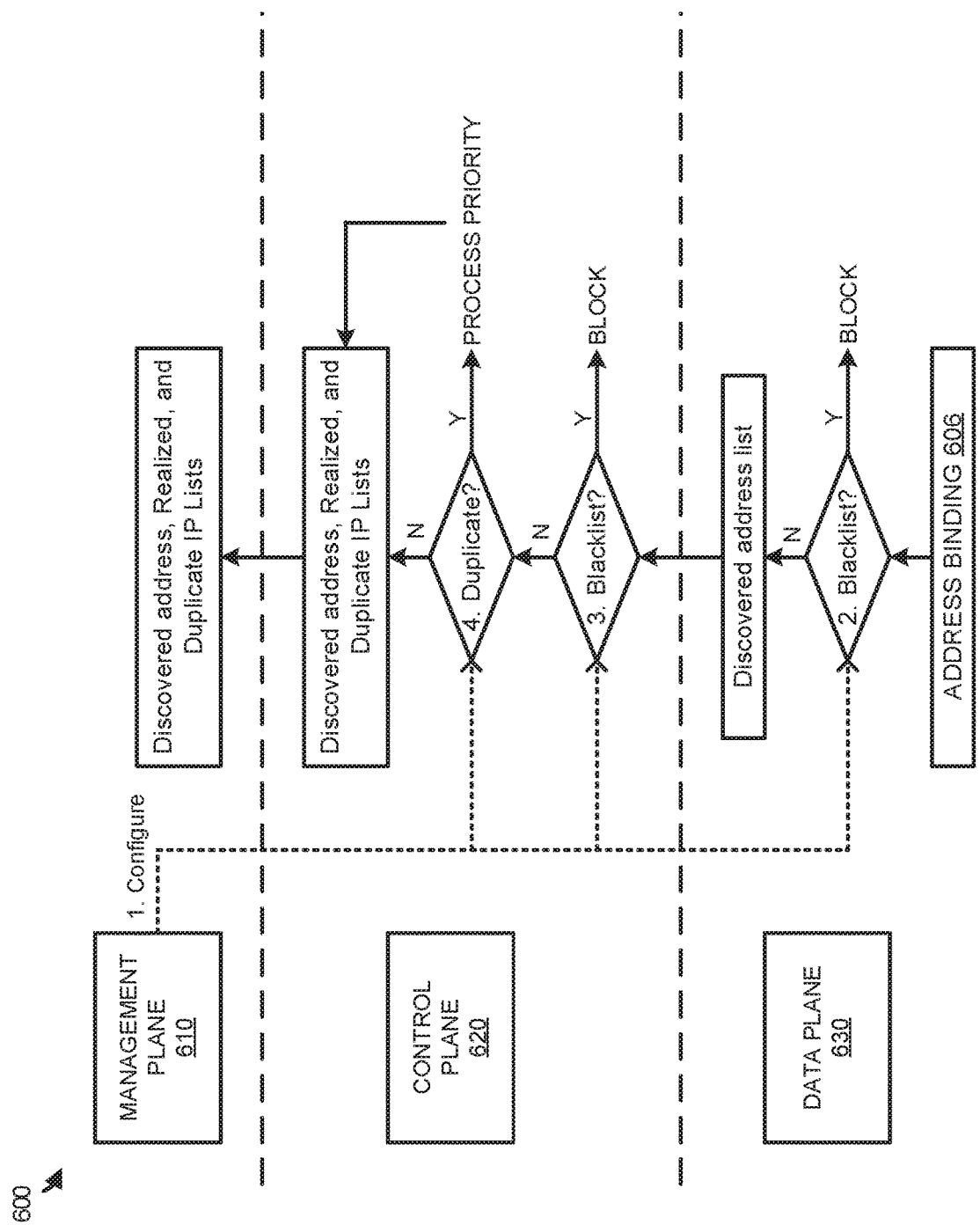
FIG. 6 illustrates an overview of managing a new address binding according to an implementation.

FIG. 6 illustrates an overview 600 of managing a new address binding according to an implementation. Overview 600 includes management plane 610, control plane 620, and data plane 630. Overview 600 is an example flow for processing discovered an IP address in the data plane.

As depicted, management plane 610 may be used to generate and configure, at step 1, at least portions of blacklists and duplicate IP address data structures. In some implementations, when a blacklist is deployed in control plane 620 and data plane 630, the blacklist may be used to identify all bindings in realized address lists and discovered lists and remove the corresponding addresses from the lists. Once the configuration is supplied to the control plane and data plane, data plane 630 may monitor for a newly discovered IP address binding within the SDN environment. Here, data plane 630 identifies address binding 606 for a logical port and determines, at step 2, whether the address binding is associated with the blacklist for the logical port provided by management plane 610. If address binding 606 is associated with the blacklist, then the address binding may be blocked. In contrast, if address binding 606 is not associated with the blacklist, then the newly discovered address binding may be added to the discovered address list and further forwarded to control plane 620.

Once the address binding is identified by control plane 620, control plane 620 determines, at step 3, if the address corresponds to a blacklist associated with the logical port. If the address binding 606 does correspond to the blacklist, then control plane 620 may block the address binding and prevent the binding from being added to the realized list associated with the logical port. Additionally, if control plane 620 determines that the address binding does not correspond to the blacklist, then control plane 620 may determine, at step 4, whether address binding 606 is a duplicate of another IP address registered in association with another logical port in the same SDN. When the address binding is not a duplicate, control plane 620 may add address binding 606 to a realized address list associated with the logical port on which the binding was discovered and add the address binding to a duplicate IP data structure (used in identifying duplicated IP addresses). When the address is a duplicate, control plane 620 may be used to determine whether an update is required for realized lists corresponding to the registered IP address. In some implementations, control plane 620 may determine which of the registration requests is associated with the earliest time stamp. For example, a first logical port may attempt to register an IP address at a first time, while a second logical port may attempt to register the same IP address at a second time. When the second request is identified, control plane 620 may determine which of the requests came earlier in time based on the timestamps associated with the requests. Control plane 620 may then select a realized list for the address and permit the realized list to add the address binding, while preventing other realized lists from adding the same address binding. Once all of the lists are updated, control plane 620 may distribute the discovered address lists, the realized address lists, and discovered duplicate IP addresses with one or more services, wherein these services may operate in the management plane in some examples.

In some implementations, control plane 620 may maintain at least one data structure that can be used to identify conflicting addresses for the SDN environment. For example, when a first logical port attempts to register an IP address, the IP address may be added to a conflict list for the SDN environment. When a second logical port attempts to register the same IP address, the second logical port may be blocked from adding the IP address to the realized list, however, a data structure may maintain timestamp information for when the IP address was attempted to be registered in association with the second logical port. Thus, if the realized address list associated with the first logical port were updated to remove the associated IP address, control plane 620 may identify the change and use the data structure to update the realized list associated with the second logical port to include the addressing binding associated with the IP address.

Figure 7:
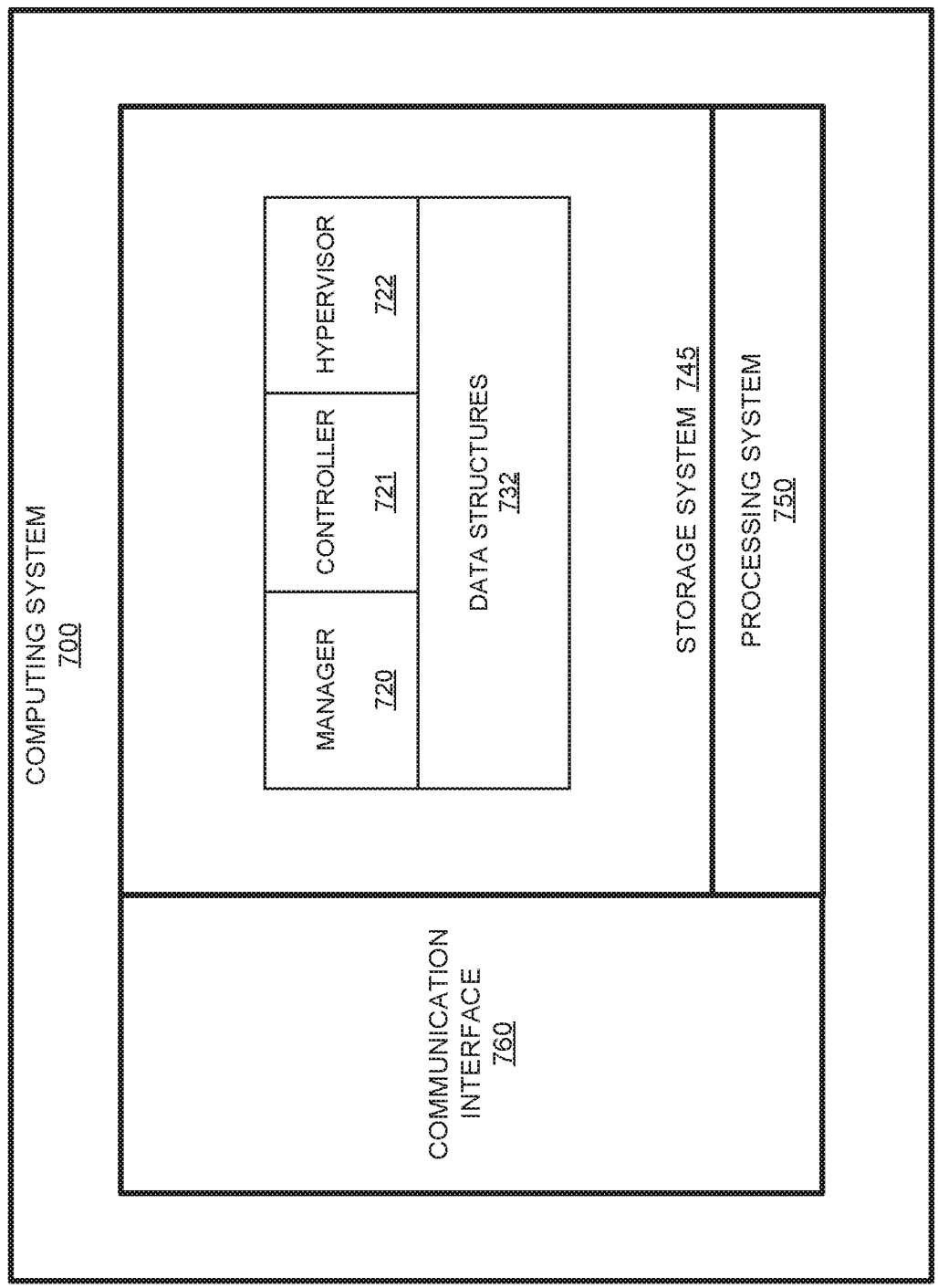
FIG. 7 illustrates a computing system to provide control and data plane services according to an implementation.

FIG. 7 illustrates a computing system 700 to provide control and data plane services according to an implementation. Computing system 700 is representative of any computing system or systems with which the various operational architectures, processes, scenarios, and sequences disclosed herein for a computing system can be implemented. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is an example of a physical network interface that can be configured to communicate with other computing systems to provide required operations for the processes executing on computing system 700. In at least one example, communication interface 760 may communicate with other host computing systems or some other computing system.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises manager 720, controller 721 and hypervisor 722 that use data structures 732. The operating software on storage system 745 may further include utilities, drivers, network interfaces, applications, or some other type of software. When read and executed by processing system 750 the operating software on storage system 745 directs computing system 700 to operate as described herein.

In at least one implementation, manager 720 may provide configuration information to controller 721 and hypervisor 722, wherein the configuration information may correspond to address binding configurations and blacklists to be implemented by controller 721 and hypervisor 722. In some implementations the blacklist and binding information may be stored as data structures 732. Once a configuration is supplied, controller 721 may maintain a realized list for each of the logical ports in the environment that indicates addressing information associated with each of the logical ports. This realized list may include IP addresses, MAC addresses, VLANs, and the like that have been identified for a logical port. In one example, manager 720 may provide a blacklist and controller 721 may remove any address bindings in a realized list associated with the blacklist. Additionally, the blacklist may be provided to hypervisor 722 that can be used to remove corresponding entries from a discovered address list associated with the particular logical port.

Once the discovered address list(s) and realized address list(s) are updated to reflect a blacklist, hypervisor 722 and controller 721 may monitor for registration of new address bindings in the SDN environment. These registrations may come from manager 720 or may be discovered using ARP, DHCP, or some other discovery mechanism. When a new address binding is identified by the data plane for a logical port, the binding may be compared to the blacklist by hypervisor 722 to determine whether the binding is permitted. If permitted, the hypervisor may add the new binding to a discovered list and forward the binding to control 721. Controller 721 may also determine whether the new address corresponds to an entry in the blacklist for the logical port. Similar to the operations of hypervisor 722, when blacklisted, controller 721 may prevent the new address binding from being added to a realized list. However, if the address is not blacklisted, it progresses to determining whether the address is a duplicate IP address. If the IP address in the binding is not determined to be a duplicate address, then the address binding may be added to the realized address list associated with the logical port and may further be added to the duplicate IP address list. In contrast, if the IP address in the address binding is determined to be a duplicate address based on a duplicate data structure in data structures 732, then control plane 720 may process the priority of the IP address registration in relation to other registrations for other logical ports based at least on timestamps associated with the registrations. When the registration with the highest priority is identified, control system 720 may permit the realized address list for the logical port associated with the highest priority to include the address binding, while blocking other binding address lists from including the address binding.

In some implementations, controller 721 may maintain information about each of the logical ports that have attempted to register a particular IP address. As a result, when a first logical port has an address binding removed from a corresponding realized list, controller 721 may determine whether another logical port has attempted to register the same address binding. If one or more ports have attempted to register the address, controller 721 may update the realized list associated with a logical port to include the binding, wherein the logical port may be selected based on timestamps associated with the registration of the IP address.

Although manager 720, controller 721, and hypervisor 722 may be implemented on a single computer, it should be understood that computing system 700 may represent distributed computers. For example, a manager may operate on a first computer and the controller may be distributed across one or more other computers, including hosts for the virtual computing elements.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of blacklisting addresses in a Software Defined Networking (SDN) environment, the method comprising:
   in a management plane of the SDN environment, configuring one or more address bindings in a blacklist for a logical port in the SDN environment;
   passing the blacklist from the management plane to a data plane and a control plane for the logical port;
   in the data plane and the control plane:
      deleting realized address bindings in a realized address list for the logical port that match the one or more address bindings in the blacklist; and
      preventing subsequent address bindings that match the one or more address bindings in the blacklist from being added to the realized address list.

2. The method of claim 1, wherein the address bindings comprise at least an internet protocol address.

3. The method of claim 1 further comprising, in the control plane and in response to deleting the realized address bindings, reporting the realized address list to one or more services.

4. The method of claim 1 further comprising:
   in the data plane and control plane:
      identifying a new address binding;
      determining that the new address binding does not match an entry in the blacklist; and
      adding the new address binding to the realized address list.

5. The method of claim 4 further comprising:
   in response to adding the new address binding to the realized address list, reporting the realized address list to one or more services.

6. The method of claim 5, wherein the one or more services comprise a firewall service.

7. The method of claim 1 further comprising:
   in the control plane:
      obtaining a list of one or more address bindings from the management plane;
      determining that a first IP address in the one or more address bindings match a second IP address in the realized address list, wherein the second IP address was identified in the data plane;
      determining that the first IP address is prioritized over the second IP address based on the management plane being prioritized over the data plane;
      deleting an address binding from the realized address list associated with the second IP address.

8. The method of claim 1 further comprising:
   in the control plane:
      identifying a new address binding from the data plane;
      determining that a first internet protocol (IP) address in the new address binding matches a second IP address in the realized address list;
      determining that the first IP address is prioritized over the second IP address based on timestamps associated with the first IP address and the second IP address; and
      deleting an address binding from the realized address list associated with the second IP address.

9. The method of claim 8 further comprising:
   in the control plane:
      identifying a second logical port associated with the new address binding; and
      adding the new address binding to a realized address list associated with the second logical port.

10. The method of claim 1 further comprising:
    in the control plane:
       identifying a deletion of an address binding in a second realized address list associated with a second logical port;
       determining that an internet protocol (IP) address in the address binding is associated with a second address binding discovered in association with the logical port;
       determining that the second address binding comprises a highest priority address binding associated with the IP address; and
       adding the second address binding to the realized address list.

11. A computing apparatus comprising:
    a storage system;
    a processing system operatively coupled to the storage system; and
    program instructions stored on the storage system to blacklist addresses in a Software Defined Networking (SDN) environment that, when executed by the processing system, direct the processing system to:
       in a management plane of the SDN environment, configure one or more address bindings in a blacklist for a logical port in the SDN environment;
       pass the blacklist from the management plane to a data plane and a control plane for the logical port;
       in the data plane and the control plane:
          delete realized address bindings in a realized address list for the logical port that match the one or more address bindings in the blacklist; and
          preventing subsequent address bindings that match the one or more address bindings in the blacklist from being added to the realized address list.

12. The computing apparatus of claim 11, wherein the program instructions further direct the processing system to, in the control plane and in response to deleting the realized address bindings, report the realized address list to one or more services.

13. The computing apparatus of claim 11, wherein the program instructions further direct the processing system to:
    in the data plane and control plane:
       identify a new address binding;
       determine that the new address binding does not match an entry in the blacklist; and
       add the new address binding to the realized address list.

14. The computing apparatus of claim 11, wherein the program instructions further direct the processing system to:
in the control plane:
obtain a list of one or more address bindings from the management plane;
determine that a first IP address in the one or more address bindings match a second IP address in the realized address list;
determine that the first IP address is prioritized over the second IP address based on timestamps associated with the first IP address and the second IP address;
delete an address binding from the realized address list associated with the second IP address.

15. The computing apparatus of claim 11, wherein the program instructions further direct the processing system to:
in the control plane:
identify a new address binding from the data plane;
determine that a first internet protocol (IP) address in the new address binding matches a second IP address in the realized address list;
determine that the first IP address is prioritized over the second IP address based on timestamps associated with the first IP address and the second IP address; and
delete an address binding from the realized address list associated with the second IP address.

16. The computing apparatus of claim 15, wherein the program instructions further direct the processing system to:
in the control plane:
identify a second logical port associated with the new address binding; and
add the new address binding to a realized address list associated with the second logical port.

17. The computing apparatus of claim 11, wherein the program instructions further direct the processing system to:
in the control plane:
identify a deletion of an address binding in a second realized address list associated with a second logical port;
determine that an internet protocol (IP) address in the address binding is associated with a second address binding discovered in association with the logical port;
determine that the second address binding comprises a highest priority address binding associated with the IP address; and
add the second address binding to the realized address list.

* * * * *